(12) United States Patent
Gharsalli et al.

(10) Patent No.: US 7,676,967 B2
(45) Date of Patent: Mar. 16, 2010

(54) MACHINE WITH AUTOMATED BLADE POSITIONING SYSTEM

(75) Inventors: Imed Gharsalli, Brimfield, IL (US); Vivek Bhaskar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 120 days.

(21) Appl. No.: 11/797,020

(22) Filed: Apr. 30, 2007

(65) Prior Publication Data

US 2008/0263912 A1 Oct. 30, 2008

(51) Int. Cl.
G05D 1/10 (2006.01)
(52) U.S. Cl. ........................................ 37/348
(58) Field of Classification Search .................. 37/348, 37/444, 466, 412–414; 172/2–6, 781; 701/50; 299/1.4, 1.5, 39.2, 39.6
See application file for complete search history.

(56) References Cited

U.S. PATENT DOCUMENTS

| 4,518,043 | A | 5/1985 | Anderson et al. |
| 4,643,261 | A | 2/1987 | Long |
| 5,607,205 | A | 3/1997 | Burdick et al. |
| 5,704,141 | A | 1/1998 | Miura et al. |
| 5,735,065 | A | 4/1998 | Yamagata et al. |
| 5,957,989 | A | 9/1999 | Egawa et al. |
| 6,028,524 | A | 2/2000 | Hartman et al. |
| 6,035,241 | A | 3/2000 | Yamamoto |
| 6,064,918 | A | 5/2000 | Ohtsukasa et al. |
| 6,230,090 | B1 | 5/2001 | Takahashi et al. |
| 6,275,757 | B1 | 8/2001 | Watanabe et al. |
| 6,282,453 | B1 | 8/2001 | Lombardi |
| 6,804,587 | B1 | 10/2004 | O Connor et al. |
| 6,819,993 | B2 | 11/2004 | Koch |
| 7,007,415 | B2 | 3/2006 | Koch |
| 7,178,606 | B2 * | 2/2007 | Pecchio ......................... 172/6 |
| 2002/0099481 | A1 | 7/2002 | Mori |
| 2004/0158355 | A1 | 8/2004 | Holmqvist et al. |
| 2006/0042810 | A1 | 3/2006 | Pecchio |
| 2006/0175541 | A1 | 8/2006 | Eglington et al. |

FOREIGN PATENT DOCUMENTS

| EP | 1 323 870 | 7/2003 |
| JP | 06207418 A | 7/1994 |
| JP | 2004/076499 | 3/2004 |
| WO | WO 2007/002675 | 1/2007 |

* cited by examiner

*Primary Examiner*—Robert E Pezzuto
(74) *Attorney, Agent, or Firm*—Finnegan, Henderson, Farabow, Garrett & Dunner

(57) ABSTRACT

A system is provided for positioning a work implement. The system has at least one actuator for actuating a movement of a work implement. The system also has at least one sensor associated with the at least one actuator and configured to sense at least one parameter indicative of a position and an orientation of the work implement. Furthermore, the system has a controller configured to automatically create a travel path for the work implement and guide the work implement in response to the data received from the at least one sensor, wherein the controller is further configured to automatically modify the travel path when detecting an imminent collision between the work implement and an obstacle.

34 Claims, 6 Drawing Sheets

MACHINE WITH AUTOMATED BLADE POSITIONING SYSTEM

TECHNICAL FIELD

The present disclosure is directed to a machine having a blade positioning system, and more particularly, to an automated blade positioning system with collision avoidance capability.

BACKGROUND

Motor graders are used primarily as a finishing tool to sculpt a surface of a construction site to a final shape and contour. Typically, motor graders include many hand-operated controls to steer the wheels of the grader, position a blade, and articulate the front frame of the grader. The blade is adjustably mounted to the front frame to move relatively small quantities of earth from side to side. In addition, the articulation of the front frame is adjusted by rotating the front frame of the grader relative to the rear frame of the grader.

To produce a final surface contour, the blade and the frame may be adjusted to many different positions. Positioning the blade of a motor grader is a complex and time-consuming task. Frequently, an operator will desire one or more unique blade positions. However, due to the geometry of the motor grader, some adjustments of the blade position may lead to collisions of the blade with parts of the motor grader or unwanted contact with the ground. Such collisions may damage the blade, motor grader, or both. Furthermore, any unwanted contact with the ground may produce unwanted surface shapes and contours that may need to be corrected.

U.S. Pat. No. 6,028,524 issued to Hartman et al. (Hartman) on Feb. 22, 2000 discloses a motor grader, which includes a system for preventing the blade from contacting the front frame and/or the tires of the motor grader. The system in Hartman includes an electronic controller, blade controls having position sensors, and frame controls having position sensors. The controller monitors the output of the position sensors to ascertain the position of the blade and frame controls. When the blade and frame controls receive input signals requesting a repositioning of the blade or frame, the controller determines the present positions of the blade and frame. The controller then calculates future blade and frame positions based on the repositioning request. After calculating the future blade and frame positions, the controller predicts whether an intersection of the future blade position and future frame position will occur. If an intersection of positions is imminent, the controller will either produce a warning signal to the operator or cancel the repositioning request.

Although the system in Hartman may prevent the blade from colliding with the front frame and/or tires of the motor grader, the operator is still left to determine an alternate path for the blade to reach the desired position. Due to the complex geometry of the terrain and motor grader, safely repositioning the blade may be a prohibitively difficult and time consuming task for an operator to perform. Furthermore, planning a new blade path may place such a demand on the operator, that other tasks necessary for the operation of the motor grader may be neglected.

The disclosed system is directed to overcoming one or more of the problems set forth above.

SUMMARY OF THE INVENTION

In one aspect, the disclosure is directed toward a work implement positioning system. The system includes at least one actuator for actuating a movement of a work implement. The system also includes at least one sensor associated with the at least one actuator and configured to sense at least one parameter indicative of a position and an orientation of the work implement. The system further includes a controller configured to automatically create a travel path for the work implement and guide the work implement in response to the data received from the at least one sensor, wherein the controller is further configured to automatically modify the travel path when detecting an imminent collision between the work implement and an obstacle.

Consistent with a further aspect of the disclosure, a method is provided for moving a work implement. The method includes sensing at least one parameter indicative of a location and an orientation of a work implement. The method also includes creating a mathematical representation of the work implement based on the at least one sensed parameter and stored data. Additionally, the method includes selecting a target location and a target orientation of the work implement. Furthermore, the method includes creating a work implement travel path based on the at least one sensed parameter and stored data. Also, a mathematical representation of possible obstacles in the travel path is created based on the at least one sensed parameter, stored data, and a target location and orientation. In addition, the method includes moving the work implement along the travel path. The method further includes automatically modifying the travel path in response to a determination that a collision between the work implement and an obstacle is imminent.

DETAILED DESCRIPTION

Figure 1:
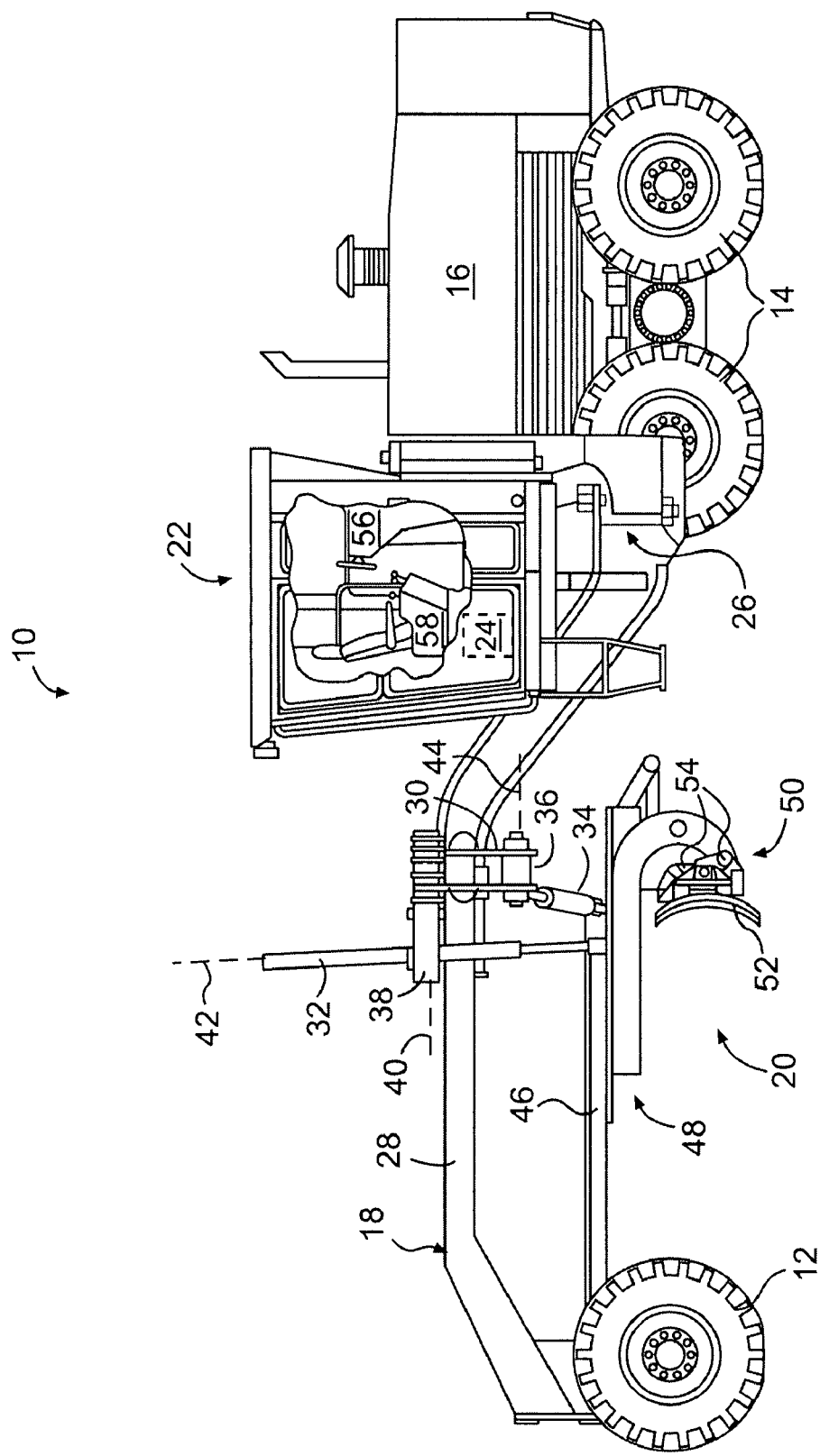
FIG. 1 is a pictorial representation of an exemplary motor grader.

An exemplary embodiment of a machine 10 is illustrated in FIG. 1. Machine 10 may be a motor grader, a backhoe loader, an agricultural tractor, a wheel loader, a skid-steer loader, or any other type of machine known in the art. Machine 10 may include a steerable traction device 12, a driven traction device 14, a power source 16 supported by driven traction device 14, and a frame 18 connecting steerable traction device 12 to driven traction device 14. Machine 10 may also include a work implement such as, for example, a drawbar-circle-moldboard assembly (DCM) 20, an operator station 22, and a blade control system 24.

Both steerable and driven traction devices 12, 14 may include one or more wheels located on each side of machine 10 (only one side shown). The wheels may be rotatable and/or tiltable for use during steering and leveling of a work surface (not shown). Alternatively, steerable and/or driven traction devices 12, 14 may include tracks, belts, or other traction devices known in the art. Steerable traction devices 12 may or may not also be driven, while driven traction device 14 may or may not also be steerable. Frame 18 may connect steerable traction device 12 to driven traction device 14 by way of, for example, an articulation joint 26. Furthermore, machine 10 may be caused to articulate steerable traction device 12 relative to driven traction device 14 via articulation joint 26.

Power source 16 may include an engine (not shown) connected to a transmission (not shown). The engine may be, for example, a diesel engine, a gasoline engine, a natural gas engine, or any other engine known in the art. Power source 16 may also be a non-combustion source of power such as a fuel cell, a power storage device, or another source of power known in the art. The transmission may be an electric transmission, a hydraulic transmission, a mechanical transmission, or any other transmission known in the art. The transmission may be operable to produce multiple output speed ratios and may be configured to transfer power from power source 16 to driven traction device 14 at a range of output speeds.

Frame 18 may include an articulation joint 26 that connects driven traction device 14 to frame 18. Machine 10 may be caused to articulate steerable traction device 12 relative to driven traction device 14 via articulation joint 26. Machine 10 may also include a neutral articulation feature that, when activated, causes automatic realignment of steerable traction device 12 relative to driven traction device 14 to cause articulation joint 26 to return to a neutral articulation position.

Frame 18 may also include a beam member 28 that supports a fixedly connected center shift mounting member 30. Beam member 28 may be, for example, a single formed or assembled beam having a substantially hollow square cross-section. The substantially hollow square cross-section may provide frame 18 with a substantially high moment of inertia required to adequately support DCM 20 and center shift mounting member 30. The cross-section of beam member 28 may alternatively be rectangular, round, triangular, or any other appropriate shape.

Center shift mounting member 30 may support a pair of double acting hydraulic rams 32 (only one shown) for affecting vertical movement of DCM 20, a double acting hydraulic ram 34 for affecting horizontal movement of DCM 20, and a link bar 36 adjustable between a plurality of predefined positions. Center shift mounting member 30 may be welded or otherwise fixedly connected to beam member 28 to indirectly support hydraulic rams 32 by way of a pair of bell cranks 38 also known as lift arms. That is, bell cranks 38 may be pivotally connected to center shift mounting member 30 along a horizontal axis 40, while hydraulic rams 32 may be pivotally connected to bell cranks 38 along a vertical axis 42. Each bell crank 38 may further be pivotally connected to link bar 36 along a horizontal axis 44. Hydraulic ram 34 may be similarly pivotally connected to link bar 36.

DCM 20 may include a drawbar member 46 supported by beam member 28 and a ball and socket joint (not shown) located proximal steerable traction device 12. As hydraulic rams 32 and/or 34 are actuated, DCM 20 may pivot about the ball and socket joint. A circle assembly 48 may be connected to drawbar member 46 via a motor (not shown) to drivingly support a moldboard assembly 50 having a blade 52 and blade positioning cylinders 54. In addition to DCM 20 being both vertically and horizontally positioned relative to beam member 28, DCM 20 may also be controlled to rotate circle and moldboard assemblies 48, 50 relative to drawbar member 46. Blade 52 may be moveable both horizontally and vertically, and oriented relative to circle assembly 48 via blade positioning cylinders 54.

Operator station 22 may embody an area of machine 10 configured to house an operator. Operator station 22 may include a dashboard 56 and an instrument panel 58 containing dials and/or controls for conveying information and for operating machine 10 and its various components.

Figure 2:
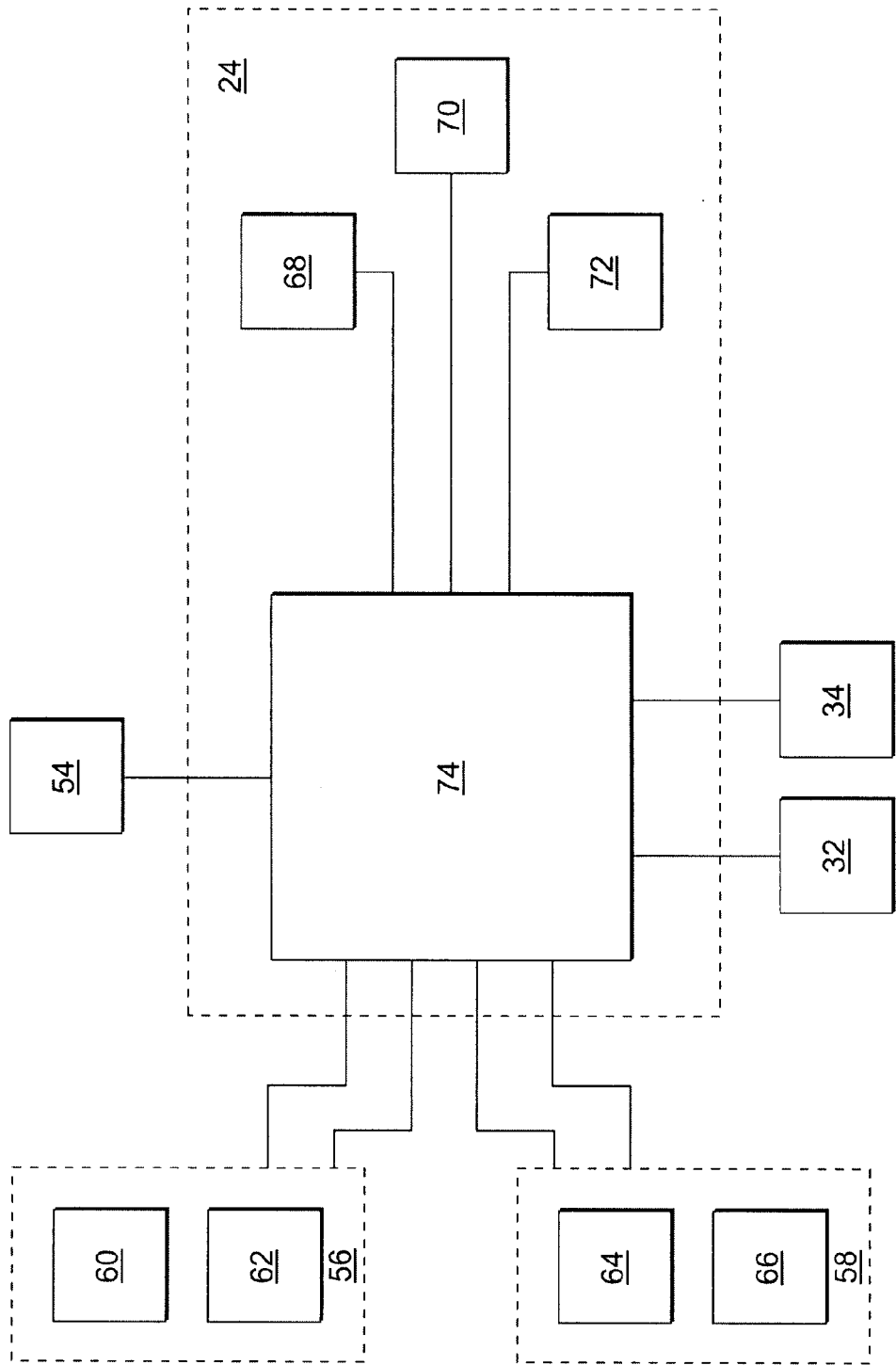
FIG. 2 is a block diagram of an exemplary blade positioning system for the motor grader of FIG. 1.

As illustrated in FIG. 2, dashboard 56 may include a display system 60 and a user interface 62. In addition, instrument panel 58 may include a display system 64 and a user interface 66. Display systems 60 and 64 and user interfaces 62 and 66 may be in communication with blade control system 24. Display systems 60 and 64 may include a computer monitor with an audio speaker, video screen, and/or any other suitable visual display device that conveys information to the operator. It is further contemplated that user interfaces 62 and 66 may include a keyboard, a touch screen, a number pad, a joystick, or any other suitable input device.

Blade control system 24 may move blade 52 to a predetermined position in response to input signals received from user interface 62 and/or 66. Blade control system 24 may include a plurality of cylinder position sensors 68, an articulation sensor 70, a proximity sensor 72, and a controller 74. It is contemplated that blade control system may include other sensors, if desired.

Cylinder position sensors 68 may sense the extension and retraction of hydraulic rams 32, 34, and/or blade positioning cylinders 54. In particular, cylinder position sensors 68 may embody magnetic pickup type sensors associated with magnets (not shown) embedded within the piston assemblies of hydraulic rams 32, 34, and blade positioning cylinders 54. As hydraulic rams 32, 34, and blade positioning cylinders 54 extend and retract, cylinder position sensors 68 may provide to blade controller 24 an indication of the position of hydraulic rams 32, 34, and blade positioning cylinders 54. It is contemplated that cylinder position sensors 68 may alternatively embody other types of position sensors such as, for example, magnetostrictive-type sensors associated with a wave guide internal to hydraulic rams 32, 34, and blade positioning cylinders 54, cable type sensors associated with cables externally mounted to hydraulic rams 32, 34, and blade positioning cylinders 54, internally or externally mounted optical type sensors, or any other type of position sensor known in the art. It should be understood that the extension and retraction of the cylinders may be compared with reference look-up maps and/or tables stored in the memory of controller 74 to determine the position and orientation of blade 52.

Articulation sensor 70 may sense the movement and relative position of articulation joint 26 and may be operatively coupled with articulation joint 26. Some examples of suitable articulation sensors 70 include, among others, length potentiometers, radio frequency resonance sensors, rotary potentiometers, machine articulation angle sensors and the like. It should be understood that the movement of articulation joint 26 may be compared with reference look-up maps and/or tables stored in the memory of controller 74 to determine the articulation of machine 10.

Proximity sensor 72 may detect the distance between the ground and blade 52. Proximity sensor 72 may be located anywhere along the bottom edge of blade 52. Alternatively, proximity sensor 72 may be located anywhere on frame 18, which may allow detection of the distance between the ground and blade 52. In addition, proximity sensor 72 may be an ultrasonic sensor, a radar sensor, an optical sensor, or any other type of sensor capable of detecting the location of the surface of the ground in relation to the bottom edge of blade 52.

Controller 74 may actuate hydraulic rams 32, 34 and blade positioning cylinders 54 to move blade 52 to a desired position and may embody a single microprocessor or multiple microprocessors that include a means for positioning blade 52. Numerous commercially available microprocessors can be configured to perform the functions of controller 74. It should be appreciated that controller 74 could readily embody a general machine microprocessor capable of controlling numerous machine functions. Controller 74 may include a memory, a secondary storage device, a processor, and any other components for running an application. Various other circuits may be associated with controller 74 such as power supply circuitry, signal conditioning circuitry, solenoid driver circuitry, and other types of circuitry.

Controller 74 may primarily operate in a manual mode and may actuate hydraulic rams 32, 34, and blade positioning cylinders 54 in response to signals received from user interface 62 and/or 66. Such signals may be generated when an operator interacts with user interfaces 62 and/or 66 to move blade 52 to a desired position. When moving blade 52 to a desired position in the manual mode, the operator may choose to store the final position and orientation of blade 52 in the memory of controller 74. The position and orientation may be stored by actuating a device associated with user interface 62 and/or 66 such as, for example, a button or keypad to generate signals, which may cause controller 74 to store the position and orientation.

Controller 74 may also be set to an automatic mode when the operator actuates a device associated with user interface 62 and/or 66 such as, for example, a button or keypad instructing controller 74 to move blade 52 to the stored position and orientation. The stored position and orientation may be utilized by controller 74 together with a current position and orientation when operating in the automatic mode to create a travel path for moving blade 52. While operating in the automatic mode, controller 74 may move blade 52 by actuating hydraulic rams 32, 34, and blade positioning cylinders 54 in response to signals received from cylinder position sensors 68, articulation sensor 70, and proximity sensor 72.

Controller 74 may monitor the movement of blade 52 in both the manual and automatic modes to determine whether a collision between blade 52 and a component of machine 10 is imminent. If an imminent collision with an obstacle is detected while controller 74 is operating in the manual mode, controller 74 may override the set of input signals from user interface 62 and/or 66 that direct blade 52 in the direction of the obstacle preventing the operator from directing blade 52 further toward the obstacle. If an imminent collision with the obstacle is detected while controller 74 is operating in the automatic mode, controller 74 may modify the blade travel path and redirect blade 52 away from the obstacle.

Figure 3:
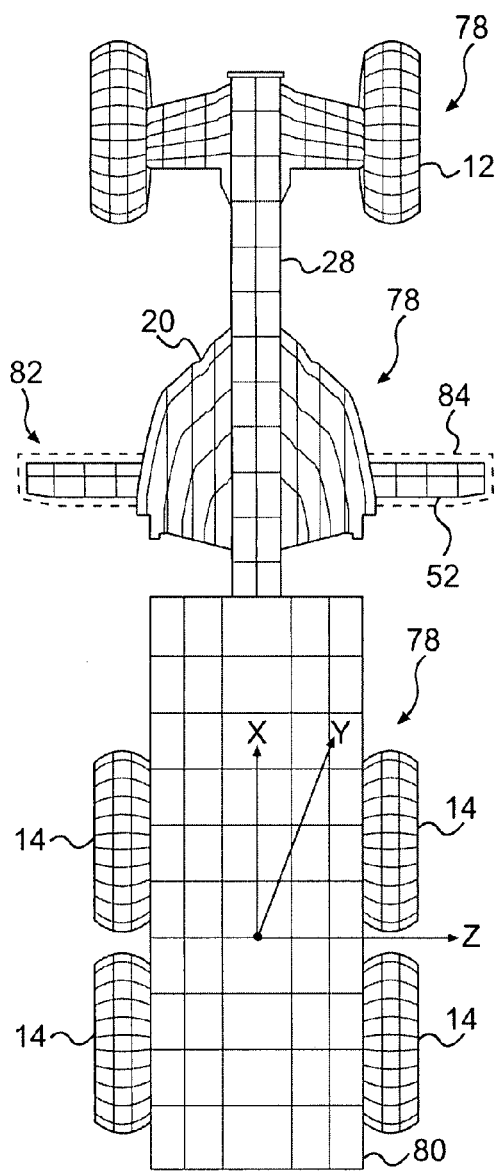
FIG. 3 is a pictorial representation of an exemplary wire-frame model of the motor grader of FIG. 1.

The monitoring of the blade movement and imminent collision detection may be performed by first creating a real-time mathematical model of machine 10, such as, for example, a wire-frame model 76 as illustrated in FIG. 3. Wire-frame model 76 may include a stationary element 78 having mathematical representations of various stationary components of machine 10 such as, for example, steerable traction devices 12, driven traction devices 14, DCM 20, and a rear frame portion 80. Controller 74 may create the component representations from data stored in the memory of controller 74. Such stored data may include the location of various data points defining a geometry, location, and orientation of each component relative to an origin of a three-dimensional global coordinate system. It is contemplated that data received from articulation sensor 70 may be used in conjunction with the stored data to create the component representations, if desired. The three-dimensional global coordinate system may originate at a location adjacent to the ground and equidistant from the center of all driven traction devices 14. The X and Z axes may generally be transverse and aligned with a forward traveling direction of machine 10, respectively. A plane defined by the X and Z axes may generally be parallel to the surface of the ground. Furthermore, the Y axis may generally be normal to the ground.

Wire-frame model 76 may also include a mobile element 82 having a mathematical representation of blade 52 surrounded by a safety zone 84. Controller 74 may use safety zone 84 to detect imminent collisions between blade 52 and potential obstacles. In particular, controller 74 may determine that a collision is imminent when an obstacle enters the volume defined by safety zone 84. An outer edge of safety zone 84 may be any distance from the surface of blade 52, such as, for example, approximately 50 mm.

Figure 4:
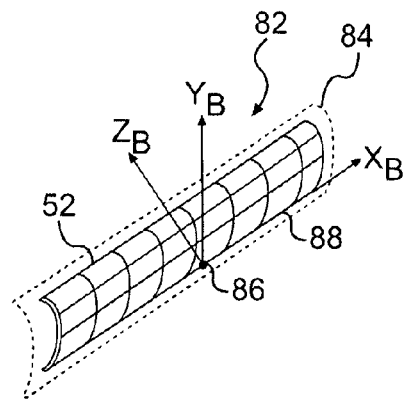
FIG. 4 is a pictorial representation of a wire-frame model of an exemplary blade of the motor grader of FIG. 1.

The components of mobile element 82 may be created from data stored in the memory of controller 74 in conjunction with data received from cylinder position sensors 68. The stored data may include the location of various data points defining a geometry and orientation of each component relative to an origin of a three-dimensional local coordinate system that moves with blade 52. As illustrated in FIG. 4, the local coordinate system may originate at a bottom-center portion 86 of blade 52. The $X_B$ and $Z_B$ axes may generally be perpendicular and parallel to a bottom edge 88 of blade 52, respectively. In addition, the $Y_B$ axis may generally be perpendicular to bottom edge 88.

Figure 5:
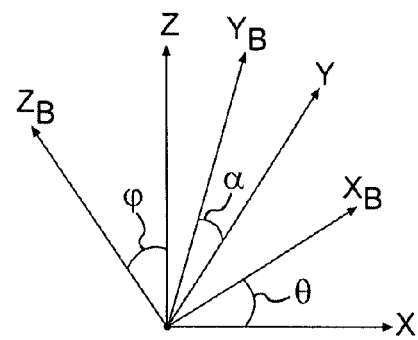
FIG. 5 is a graphical representation of a local blade coordinate system superimposed on a global coordinate system.

Data describing the components of stationary element 78 may be incompatible with data describing the components of mobile element 82, because stationary element 78 and mobile element 82 may reference different coordinate systems. This incompatibility may hinder the ability of controller 74 to detect imminent collisions. However, by transforming the data describing mobile element 82 into a format referencing the global coordinate system, the incompatible data may be made compatible, thereby permitting controller 74 to detect imminent collisions. Controller 74 may transform mobile element data according to Eq. 1:

$$P = M_B \times P_o \qquad \text{Eq. 1}$$

where $P_o$ is any point on blade 56 expressed in the local coordinate system, $M_B$ is a transform matrix, and $P$ is any point on blade 56 expressed in the global coordinate system. $P$ and $P_o$ may be described as the four-dimensional vector:

$$\begin{bmatrix} x \\ y \\ z \\ 1 \end{bmatrix}$$

where x, y, and z represent the x, y, and z components of the position of a point on blade 52 relative to the respective coordinate system. $M_B$ may be described as the four-dimensional matrix:

$$M_B \begin{bmatrix} (\cos\varphi * \cos\alpha + \sin\varphi * \sin\theta * \sin\alpha) & (\sin\varphi * \cos\alpha - \cos\varphi * \sin\theta * \sin\alpha) & (\cos\theta * \sin\alpha) & x \\ (-\sin\varphi * \cos\theta) & (\cos\varphi * \cos\theta) & (\sin\theta) & y \\ (\sin\varphi * \sin\theta * \cos\alpha - \cos\varphi * \sin\alpha) & (-\cos\varphi * \sin\theta * \cos\alpha - \sin\varphi * \sin\alpha) & (\cos\theta * \cos\alpha) & z \\ 0 & 0 & 0 & 1 \end{bmatrix}$$

where the first three components of the first three rows represent the x, y, and z components of unit vectors running along the $X_B$, $Y_B$, and $Z_B$ axes of the local coordinate system, as projected onto the global coordinate system. The unit vectors may indicate the orientation of blade 52 relative to the global coordinate system. The last components of the first three rows represent the x, y and z distances between the origins of the local coordinate system and the global coordinate system. The distance between the origins of the local coordinate system and the global coordinate system may indicate the location of bottom-center portion 86 of blade 52 relative to the global coordinate system. Angles φ, α, and θ represent the orientation of the local coordinate system axes relative to the global coordinate system axes. The relative orientation of the local coordinate system axes may be readily apparent if the local coordinate system is superimposed on the global coordinate system in such a manner that both coordinate systems share the same origin. FIG. 5 illustrates such a configuration. As can be seen, φ is the angle between the Z axis of the global coordinate system and the $Z_B$ axis of the local coordinate system. In addition, α is the angle between the Y axis of the global coordinate system and the $Y_B$ axis of the local coordinate system. Furthermore, θ is the angle between the X axis of the global coordinate system and the $X_B$ axis of the local coordinate system.

Figure 6:
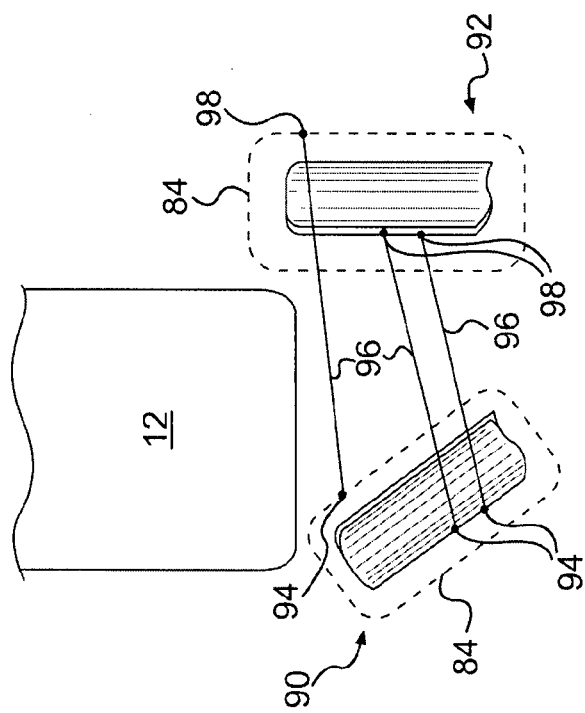
FIG. 6 is a pictorial representation illustrating a movement of the exemplary blade of FIG. 3.

As illustrated in FIG. 6, controller 74, while operating in the automatic mode, may use the position and orientation data of a current position 90 and a previously stored target position 92 of blade 52 as expressed in the global coordinate system to create a travel path for blade 52. The travel path may be constructed in such a way that any point 94 at starting position 90 may be connected by a straight line 96 to a corresponding point 98 at target position 92. As point 94 moves with blade 52 along the travel path, point 94 may follow generally straight line 96 until it reaches point 98. It should be understood that points 94 and 98 may be located at any location on blade 52 and/or on safety zone 84. Also, it is contemplated that controller 74 may create more complicated travel paths by utilizing multiple straight lines 96 to connect corresponding points 94 and 98, if desired. For example, if blade 52 initially moves vertically off of the ground, moves horizontally toward target position 92, and moves vertically toward the ground, points 94 and 98 may be connected by three straight lines 96. It is contemplated points 94 and 98 may be connected by curved lines, if desired.

As blade 52 moves toward target position 92, controller 74 may reference signals received from cylinder position sensors 68 and update the position and orientation data of blade 52 in wire-frame model 76. In addition, controller 74 may update the position and orientation data of blade 52 at regularly spaced intervals of time, such as, for example, every 15 milliseconds. It should be understood that controller 74 may determine that a collision is imminent if an updated position and orientation of blade 52 indicates that an obstacle, such as, for example, steering traction device 12 has entered safety zone 84 during the movement of blade 52.

Figure 7:
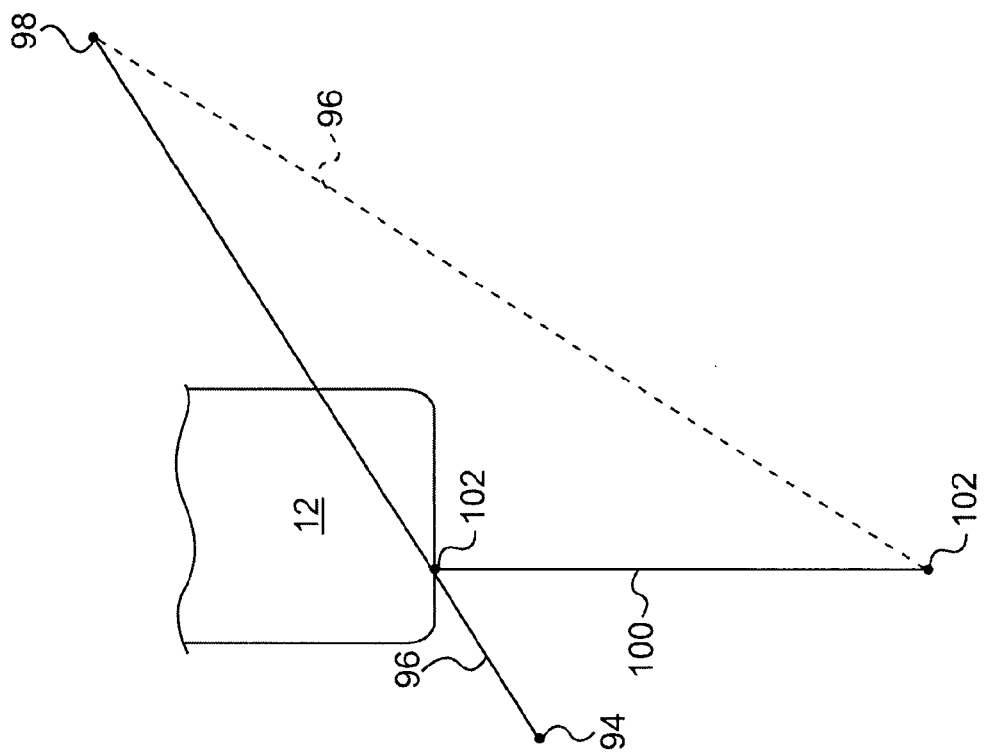
FIG. 7 is a graphical representation illustrating a collision avoidance movement of the exemplary blade of FIG. 3.

As illustrated in FIG. 7, when operating in the automatic mode, controller 74 may create an escape vector 100 to alter the travel path of blade 52 and prevent an imminent collision. Escape vector 100 may originate at a point 102 located on a portion of safety zone 84 that has been penetrated by an obstacle (i.e. steering traction device 12). Point 102 may travel along escape vector 100 as blade 52 is moved away from steering traction device 12. Controller 74 may shift straight line 96 away from steering traction device 12 in such a manner that point 102 may remain on straight line 96 while moving along escape vector 100. In addition, straight line 96 may continue to terminate at point 98. Controller 74 may perform mathematical iterations of alternate travel paths of blade 52 and associated straight lines 96 until straight line 96 no longer passes through steering traction device 12. The direction and length of escape vector 100 may be influenced by several factors, such as, for example, the local geometry of the obstacle, the location of target point 98, and the velocity of blade 52. In particular, escape vector 100 may move point 102 on blade 52 or safety zone 84 away from steering traction device 12 in a direction that is generally normal to a surface of steering traction device 12 that intersects straight line 96 at point 102. In addition, higher blade velocities may result in longer escape vectors 100, while lower blade velocities may result in shorter escape vectors 100.

Figure 8B:
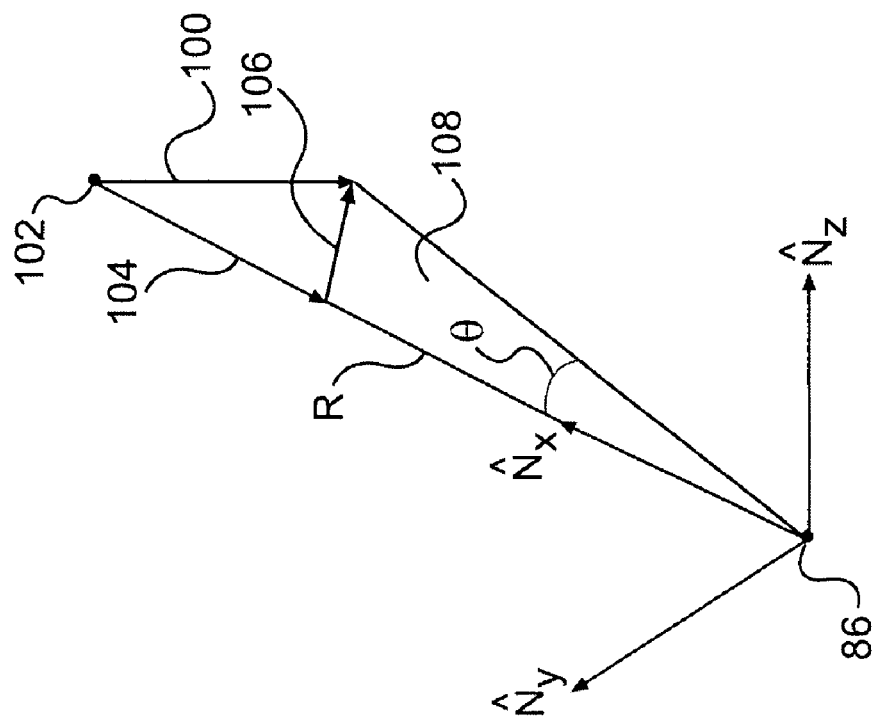
FIG. 8b is a graphical representation illustrating a collision avoidance movement of the exemplary blade of FIG. 3.
Figure 8A:
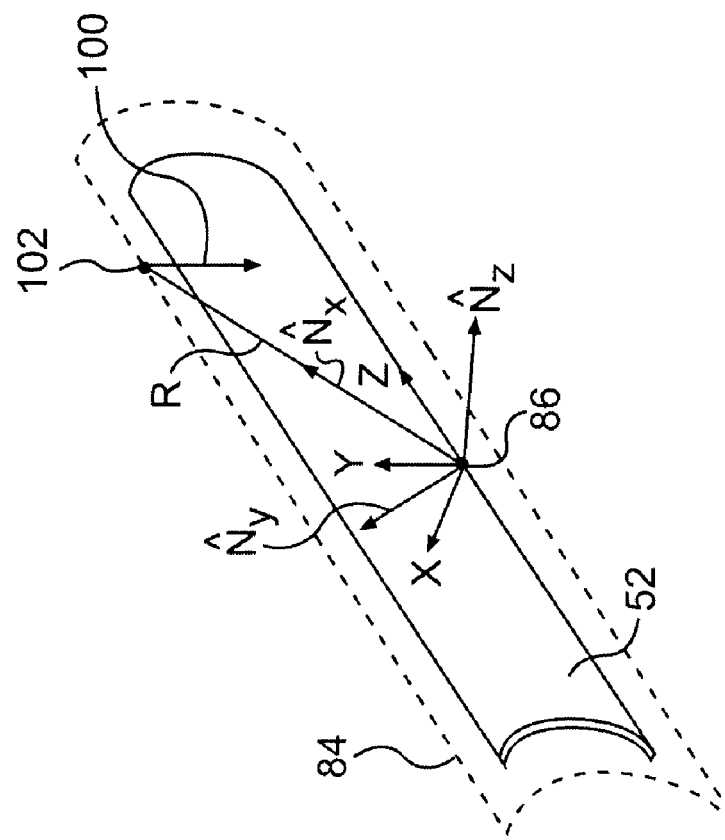
FIG. 8a is a graphical representation illustrating a collision avoidance movement of the exemplary blade of FIG. 3.

FIGS. 8a and 8b illustrate an exemplary collision avoidance motion of blade 52 as described in terms of a translation of bottom-center portion 86 and a rotation about an axis passing through bottom-center portion 86. Escape vector 100 may include a radial component 104 and a tangential component 106. Radial component 104 may pass through bottom-center portion 86 and represent a translation of blade 52. Tangential component 106 along with bottom-center portion 86 may define a plane 108. An axis of rotation 110 may be normal to plane 108 and pass through bottom-center portion 86. Both radial component 104 and tangential component 106 may be expressed in terms of the local blade coordinate system. It should be understood that if escape vector 100 passes through bottom-center portion 86, tangential component 106 may have a magnitude of zero.

As the travel path, position, and orientation of blade 52 are modified, matrix $M_B$ may be modified according to Eq. 2:

$$M'_B = M_B \cdot M_A \cdot M_R \cdot M_A^{-1} \qquad \text{Eq. 2}$$

where $M'_B$ is the modified blade matrix, $M_B$ is the original blade matrix, $M_A$ is a unit vector matrix, and $M_R$ is a translation and rotation matrix. $M_A$ may be described as the four-dimensional matrix:

$$M_A \begin{bmatrix} n_{1_x} & n_{2_x} & n_{3_x} & 0 \\ n_{1_y} & n_{2_y} & n_{3_y} & 0 \\ n_{1_z} & n_{2_z} & n_{3_z} & 0 \\ 0 & 0 & 0 & 1 \end{bmatrix}$$

where $n_{1_x}$, $n_{2_x}$, and $n_{3_x}$ are the x, y, and z components of a unit vector n, defining a new x axis that follows the rotation of blade 52. $n_{1_y}$, $n_{2_y}$, and $n_{3_y}$ are the x, y, and z components of a unit vector $n_y$ defining a new y axis. In addition, $n_{1z}$, $n_{2z}$, and $n_{3z}$ are the x, y, and z components of a unit vector $n_z$ defining a new z axis. $M_R$ may be described as the four-dimensional matrix:

$$M_R \begin{bmatrix} \cos\Delta\theta & 0 & \sin\Delta\theta & V_e t_x \\ 0 & 1 & 0 & V_e t_y \\ -\sin\Delta\theta & 0 & \cos\Delta\theta & V_e t_z \\ 0 & 0 & 0 & 1 \end{bmatrix}$$

where $\Delta\theta$ is the rotation angle about the y axis of the local coordinate system, $V_e t_x$ is the x component of tangential component 106, $V_e t_y$ is the y component of tangential component 106, and $V_e t_z$ is the x component of tangential component 106. The magnitudes of radial component 104, tangential component 106, and angle of rotation $\theta$ may be calculated according to Eqs. 3-8:

$$n_x = \frac{v}{R} \qquad \text{Eq. 3}$$

$$V_e r = (V_e \cdot n_x) n_x \qquad \text{Eq. 4}$$

$$n_y = V_e \times n_x \qquad \text{Eq. 5}$$

$$n_z = n_x \times n_y \qquad \text{Eq. 6}$$

$$V_e t = (V_e \cdot n_z) n_z \qquad \text{Eq. 7}$$

$$\Delta\theta = \frac{V_e r}{R} \qquad \text{Eq. 8}$$

where R is a vector from point 102 to bottom-center portion 86.

Modified matrix $M'_B$ may be executed once an imminent collision is detected. It is contemplated that blade 52 may encounter multiple obstacles as blade 52 travels along the travel path, if desired. In such circumstances, controller 74 may prioritize the obstacles and modify the travel path of blade 52 according to the obstacle with the higher priority. After modifying the travel path in accordance with the highest ranked obstacle, controller 74 may modify the travel path in accordance with the next lower ranked obstacle. It is further contemplated that priority rankings of obstacles may be based upon proximity to the surface of blade 52, if desired.

Figure 9:
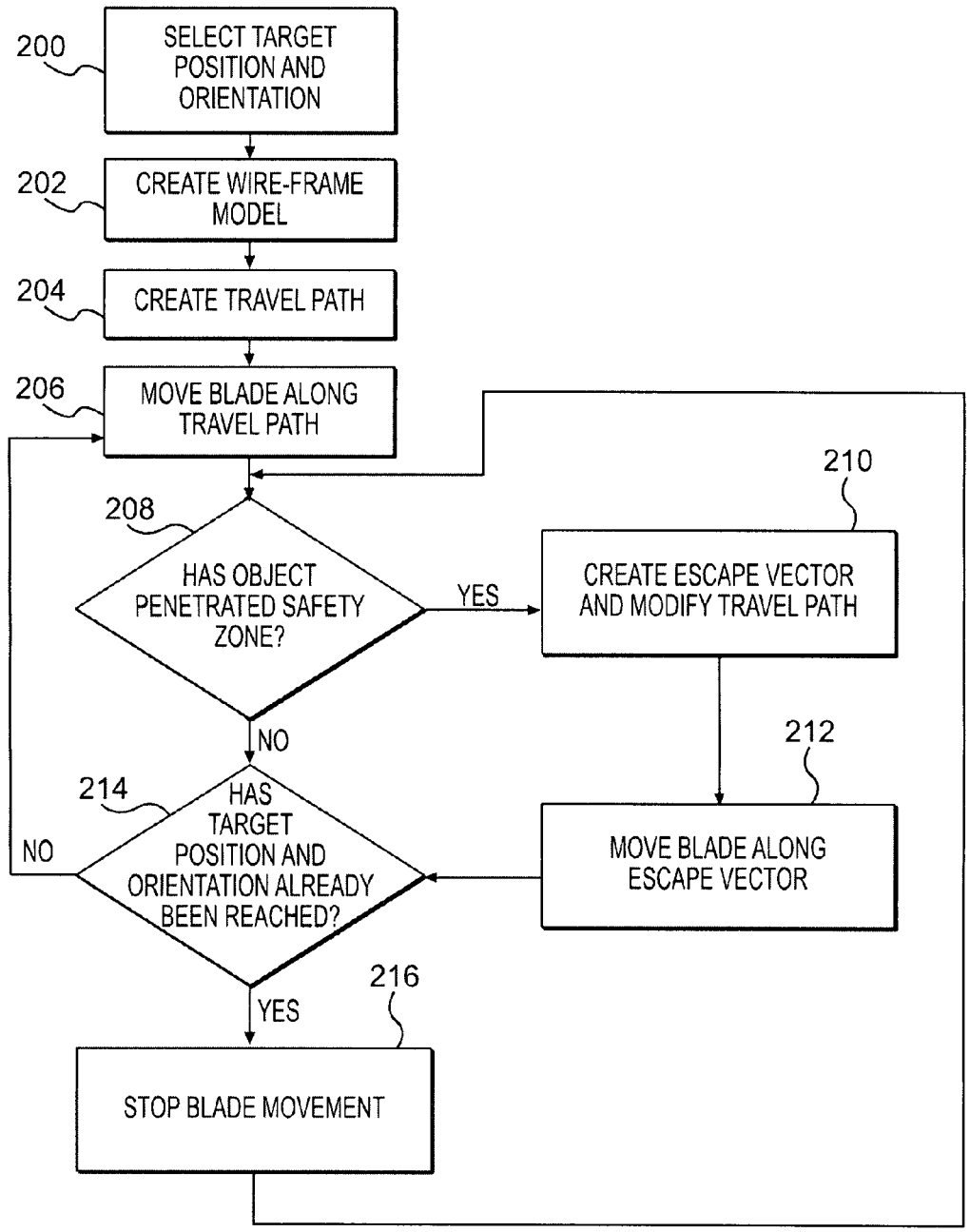
FIG. 9 is a flow diagram of an exemplary disclosed method for moving the blade of FIG. 3.

FIG. 9, which is discussed in the following section, illustrates the operation of machine 10 utilizing embodiments of the disclosed system. Specifically, FIG. 9 illustrates an exemplary method for automatically moving blade 52 from an initial position to a target position.

INDUSTRIAL APPLICABILITY

The disclosed system may ensure that a tool on a mobile machine may be moved to a desired position with reduced risk of an undesired collision. The tool may be moved manually or automatically. In either mode, a controller may monitor the position of the tool in relation to other structures of the mobile machine and take action to avoid a collision. In manual mode, the controller may override movement commands from an operator so that the tool cannot be directed toward an obstacle. In the automatic mode, the controller may modify a tool travel path and move the tool away from the obstacle. Automatic collision avoidance may reduce the likelihood of the tool or other elements of the mobile machine being damaged from collisions. The operation of blade positioning system 24 with collision avoidance will now be explained.

FIG. 9 illustrates a flow diagram depicting an exemplary method for automatically positioning blade 52. The method may begin by selecting a target position and orientation for blade 52 (step 200). The selection may be performed by an operator. In particular, the operator may actuate a device on user interface 62 or 66, such as, for example, a button, touch screen, knob, switch, or other device capable of sending a selection signal to controller 74. The selection signal may be indicative of a blade position and orientation previously stored in controller 74.

After selecting the target position and orientation, controller 74 may create wire-frame model 76 of machine 10 and blade 52 to monitor a movement of blade 52 in relation to machine 10 (step 202). The representation of blade 52 in wire-frame model 76 may include safety zone 84 for determining imminent collisions. Once wire-frame model 76 has been created, controller 74 may create a travel path for blade 52 from current position 90 to target position 92 (step 204). After the travel path has been created, controller 74 may actuate hydraulic rams 32 and 34 and blade positioning cylinders 54 to autonomously move blade 52 along the travel path (step 206).

While moving blade 52 along the travel path, controller 74 may receive position and orientation data from cylinder position sensors 68 at regularly timed intervals, such as, for example, every 15 milliseconds. Controller 74 may compare the data received from cylinder position sensors 68 to maps, charts, etc. stored in controller 74 to determine the actual position and orientation of blade 52 with respect to machine 10. Controller 74 may then compare the current location of blade 52 with the location of the components of machine 10 (step 208).

Controller 74 may determine the location and orientation of blade 52 in relation to the components of machine 10 and the ground by comparing the data received from cylinder position sensors 68 and proximity sensor 72 to maps, charts, etc. stored in controller 74. Controller 74 may conclude that a collision or unwanted contact with the ground is imminent if, during the movement of blade 52, a component of machine 10 or the ground enters safety zone 84. If controller 74 determines that a collision is imminent (step 208: Yes), then controller 74 may create escape vector 100 and modify the travel path to move blade 52 away from and avoid the obstacle or ground (step 210). Once escape vector 100 is created and the travel vector is modified, blade 52 may be moved away from the obstacle or ground along escape vector 100 until the position and orientation of blade 52 is aligned with the modified travel path (step 212).

After blade 52 is aligned with the modified travel path, controller 74 may compare the current and previous positions and orientations of blade 52 to the target position and orientation (step 214). Controller 74 may also compare the current and previous positions and orientations of blade 52 to the target position and orientation if controller 74 determines that no collision is imminent (step 208: No). If controller 74 determines that the orientation and position of blade 52 is or has been substantially the same as the target orientation and position (step 214: Yes), then controller 74 may terminate the movement of blade 52 (step 216). After the termination of the movement of blade 52, step 208 may be repeated (i.e. controller 74 may compare the current location of blade 52 with the location of the components of machine 10). However, if controller 74 determines that the current and previous locations and orientations of blade 52 are not the same as the target location and position (step 214: No), then step 206 may be repeated (i.e. controller 74 may actuate hydraulic rams 32 and 34 and blade positioning cylinders 54 to autonomously move blade 52 along the travel path).

It should be understood that the disclosed method may continue indefinitely until it is stopped by the operator. The automatic blade positioning operation may be terminated at any step in the method. Furthermore, the operator may terminate the operation by actuating a device on user interface 62 or 66, such as, for example, a button, touch screen, knob, switch, or other device capable of sending a termination signal to controller 74.

Automatic path generation and collision avoidance may relieve the operator of the complex task of positioning the blade, thereby freeing the operator to devote his limited resources to other tasks required for the proper operation of the motor grader. In addition, automating the positioning and orienting of the blade may reduce possible damage to the blade and/or motor grader caused by human error. Furthermore, the risk of human error adversely affecting other tasks such as, for example, steering the motor grader, may be reduced because the operator can devote more attention to such other tasks.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A work implement positioning system for a mobile machine, comprising:
   at least one actuator for actuating a movement of a work implement;
   at least one sensor associated with the at least one actuator and configured to sense at least one parameter indicative of a current position and orientation of the work implement; and
   a controller configured to automatically create a travel path for the work implement between the current position and orientation and a preset position and orientation and to move the work implement along the travel path the controller further configured to automatically modify the travel path when detecting an imminent collision between the work implement and a portion of the machine.

2. The work implement positioning system of claim 1, wherein the controller is further configured to determine that a collision between the work implement and the portion of the machine is imminent when the distance between a surface of the work implement and the portion of the machine is less than a predetermined threshold.

3. The work implement positioning system of claim 1, further including at least one ground sensor configured to sense a parameter indicative of a distance between the work implement and the ground.

4. The work implement positioning system of claim 3, wherein the controller is further configured to automatically modify the travel path and move the work implement in response to data received from the at least one ground sensor.

5. The work implement positioning system of claim 1, wherein the controller is configured to receive an operator signal providing the preset position and orientation.

6. The work implement positioning system of claim 1, wherein the controller is configured to prioritize imminent collisions when determining more than one imminent collision with more than one portion of the machine.

7. The work implement positioning system of claim 6, wherein the controller is configured to automatically modify the travel path to avoid imminent collisions in a sequence based on the priority of the imminent collisions.

8. The work implement positioning system of claim 7, wherein the priority is assigned by a relative distance between each portion of the motorgrader and the work implement.

9. The work implement positioning system of claim 1, wherein the controller is configured to compare a three-dimensional model of the work implement with a three dimensional model of the portion of the machine to determine when a collision is imminent.

10. The work implement positioning system of claim 9, wherein the controller is configured to generate a collision zone based on the model of the work implement, and to determine when a collision is imminent based upon determining if the portion of the machine has entered the zone.

11. The work implement positioning system of claim 9, wherein the three-dimensional model of the work implement and the three-dimensional model of the at least one portion of the machine are based on independent coordinate systems, and the controller is further configured to correlate the coordinate systems.

12. The work implement positioning system of claim 1, further including at least one ground sensor configured to sense a parameter indicative of a distance between the work implement and the ground, the controller further configured to modify the path to avoid an undesired collision between the work implement and the ground.

13. A method for moving a work implement of a mobile machine, comprising:
   sensing at least one parameter indicative of a current location and orientation of the work implement;
   creating a mathematical three-dimensional representation of the work implement based on the at least one sensed parameter and stored geometric data of the work implement;
   selecting a target location and orientation of the work implement;
   creating a work implement travel path based on the current location and orientation and the target location and orientation;
   creating a three-dimensional mathematical representation of a portion of the mobile machine;
   automatically moving the work implement along the travel path; and
   comparing the mathematical representations of the work implement and the portion of the mobile machine along the travel path to determine that a collision between the work implement and the portion of the mobile machine is imminent, and automatically modifying the travel path to avoid the collision.

14. The method of claim 13, wherein the determination that a collision is imminent includes determining that a distance between a surface of the work implement and the portion of the mobile machine is less than a predetermined threshold.

15. The method of claim 13, further including continuously moving the work implement even when an imminent collision is determined.

16. The method of claim 13, wherein the mathematical representation of the work implement is updated at predetermined intervals of time.

17. The method of claim 13, wherein moving the work implement along the travel path includes moving the work implement in response to input from an operator.

18. The method of claim 17, further including overriding the input from the operator upon detection of an imminent collision between the work implement and the portion of the mobile machine.

19. A mobile machine, comprising:
a first frame operatively connected to a first traction device;
a second frame operatively connected to a second traction device;
a work implement operatively connected to the first frame and configured for movement along a plurality of axes;
at least one actuator for actuating a movement of the work implement along a first axis of the plurality of axes;
at least one sensor associated with the at least one actuator and configured to sense at least one parameter indicative of a current position and orientation of the work implement; and
a controller configured to:
automatically create a travel path for the work implement from the current position and orientation to a preset position and orientation;
move the work implement along the travel path; and
automatically modify the travel path when detecting an imminent collision between the work implement and a portion of the mobile machine.

20. The mobile machine of claim 19, wherein the controller is further configured to determine that a collision between the work implement and the obstacle is imminent when the distance between a surface of the work implement and the portion of the mobile machine is less than a predetermined threshold.

21. The mobile machine of claim 19, wherein the controller is configured to receive an operator signal providing the preset position and orientation.

22. The mobile machine of claim 19, wherein the controller is configured to prioritize imminent collisions when determining more than one imminent collision.

23. The mobile machine of claim 22, wherein the controller is configured to automatically modify the travel path to avoid imminent collisions in a sequence based on the priority of the imminent collisions.

24. The mobile machine of claim 23, wherein the priority is assigned by a relative distance between the work implement and the portions of the mobile machine for which a collision is determined to be imminent.

25. The work implement positioning system of claim 19, further including at least one ground sensor configured to sense a parameter indicative of a distance between the work implement and the ground, the controller further configured to modify the path to avoid an undesired collision between the work implement and the ground.

26. The mobile machine of claim 19, further comprising an articulation sensor configured to provide an indication of articulation between the first frame and the second frame, the controller further configured to detect the imminent collision based on the indication of articulation.

27. The mobile machine of claim 19, wherein the controller is further configured to compare a three-dimensional model of the work implement with a three dimensional model of the portion of the machine to determine when a collision is imminent.

28. The mobile machine of claim 27, wherein the controller is configured to generate a collision zone based on the model of the work implement, and to determine when a collision is imminent based upon determining if the portion of the machine has entered the zone.

29. The work implement positioning system of claim 27, wherein the three-dimensional model of the work implement and the three-dimensional model of the at least one portion of the machine are based on independent coordinate systems, and the controller is further configured to correlate the coordinate systems.

30. A motorgrader, comprising:
a front end frame including a pair of steerable wheels operatively connected to a first end of the front end frame;
a rear end frame supporting a rower source operatively connected to left and right driven wheels, a second end of the front end frame pivotally connected to the second end frame at an articulation joint;
a drawbar-circle-moldboard assembly having a blade with a longitudinal bottom edge extending between first and second ends of the blade, the drawbar-circle-moldboard assembly having first and second sides, the drawbar-circle-moldboard assembly configured for horizontal movement transverse to a longitudinal axis of the front end frame and vertical movement of the first and second sides relative to the front end frame, the blade operatively connected for rotational, horizontal and vertical movement as part of the drawbar-circle-moldboard assembly;
a controller configured to:
receive positional signals indicative of a sensed blade position, and to generate a three-dimensional model of the blade geometry and orientation:
generate a first travel path to automatically move the blade between the sensed position and a final position;
generate a modified travel path based on a comparison of the three-dimensional model of the blade geometry and orientation relative to a three-dimensional model of geometry and orientation of a portion of the motorgrader to avoid collision between the blade and one or more motorgrader components; and
automatically move the blade from the sensed position to the final position based upon the modified travel path.

31. The motorgrader of claim 30, wherein the motorgrader components include the front wheels, the rear wheels, the front end frame and/or the rear end frame.

32. The motorgrader of claim 30, wherein the controller is further configured to define a zone surrounding the blade, avoidance of collision being determined upon an intersection of a portion of the zone with a portion of the three-dimensional model of the portion of the motorgrader.

33. The motorgrader of claim 30, further including a ground sensor configured to provide a signal to the controller indicative of a ground position, the controller further configured to modify the travel path to avoid undesired collisions between the blade and the ground.

34. The motorgrader of claim 30, further comprising an articulation sensor configured to provide an indication of articulation between the front end frame and rear end frame to modify the three-dimensional model of geometry and orientation of the portion of the motorgrader.

* * * * *